US012619529B2

(12) United States Patent
Kerstetter et al.

(10) Patent No.: US 12,619,529 B2
(45) Date of Patent: May 5, 2026

(54) PERIODIC AND ACTIVITY-BASED MEMORY MANAGEMENT

(71) Applicant: Micron Technology, Inc., Boise, ID (US)

(72) Inventors: Bryan D. Kerstetter, Kuna, ID (US); Donald M. Morgan, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 43 days.

(21) Appl. No.: 18/439,437

(22) Filed: Feb. 12, 2024

(65) Prior Publication Data

US 2024/0281368 A1     Aug. 22, 2024

Related U.S. Application Data

(60) Provisional application No. 63/447,250, filed on Feb. 21, 2023.

(51) Int. Cl.
    *G06F 12/02*          (2006.01)
(52) U.S. Cl.
    CPC .. *G06F 12/0246* (2013.01); *G06F 2212/7211* (2013.01)
(58) Field of Classification Search
    None
    See application file for complete search history.

(56) References Cited

U.S. PATENT DOCUMENTS

| | | | | |
|---|---|---|---|---|
| 11,011,215 B1* | 5/2021 | Parry | ................. | G06F 13/1668 |
| 11,748,032 B2 | 9/2023 | Chen | | |
| 2009/0172496 A1* | 7/2009 | Roine | ................... | H03M 13/19 |
| | | | | 711/E12.001 |
| 2013/0250711 A1* | 9/2013 | Shiah | ............... | G11C 11/40603 |
| | | | | 365/222 |
| 2020/0097684 A1* | 3/2020 | Weidele | ................... | G11C 7/24 |
| 2021/0287736 A1* | 9/2021 | Park | .................. | G11C 11/40611 |
| 2022/0011944 A1* | 1/2022 | Malik | ................... | G06F 3/0659 |
| 2022/0113868 A1* | 4/2022 | Cowles | ................. | G06F 3/0653 |
| 2022/0155991 A1* | 5/2022 | Neudorf | ............... | G06F 3/0673 |
| 2023/0359361 A1 | 11/2023 | Kerstetter et al. | | |

* cited by examiner

*Primary Examiner* — Stephanie Wu
(74) *Attorney, Agent, or Firm* — Brooks, Cameron & Huebsch, PLLC

(57)     ABSTRACT

Systems, methods, and apparatuses are provided for periodic and activity-based memory management. A memory management bank can be coupled to a memory management block, wherein the memory management bank includes a plurality of memory banks. Each memory bank of the plurality of memory banks includes an activate counter to increment responsive to the memory bank receiving an activate command and circuitry to determine whether a value of the activate counter is equal to or greater than a wear leveling threshold and perform a wear leveling operation on data stored in the memory bank responsive to determining the value of the activate counter is equal to or greater than the wear leveling threshold.

18 Claims, 4 Drawing Sheets

213

ACTIVATE<n×m:0>           PERIODIC MM COMMAND<m:0>

223    222

| MEMORY MANAGEMENT COUNTER | ACTIVITY AWARE PERIODIC MM BLOCK |

SENSE & FLIP OPERATION      WrL OPERATION

243

228-1     234-1     242-1

WEAR LEVELING CIRCUITRY    231-1

236-1    ACTIVATE COUNTER 238-1    COMPARISON CIRCUITRY

BANK<0>

228-2     234-2     231-2

WEAR LEVELING CIRCUITRY 236-2    ACTIVATE COUNTER    242-2

238-2    COMPARISON CIRCUITRY

BANK<1>

229

ADDITIONAL MEMORY MANAGEMENT BANKS UP TO MM BANK<m>

228-N     234-N    242-N

WEAR LEVELING CIRCUITRY

236-N    ACTIVATE COUNTER

238-N    COMPARISON CIRCUITRY    231-N

BANK<n>    MM BANK<0>

FIG. 2

PERIODIC AND ACTIVITY-BASED MEMORY MANAGEMENT

PRIORITY INFORMATION

This application claims the benefit of U.S. Provisional Application No. 63/447,250, filed on Feb. 21, 2023, the contents of which are incorporated herein by reference.

TECHNICAL FIELD

Embodiments of the disclosure relate generally to a memory sub-system, and more specifically, relate to periodic and activity-based memory management.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), ferroelectric random access memory (FERAM), magnetic random access memory (MRAM), and programmable conductive memory, among others.

Memory devices can be utilized as volatile and non-volatile memory for a wide range of electronic applications in need of high memory densities, high reliability, and low power consumption. Non-volatile memory may be used in, for example, personal computers, portable memory sticks, solid state drives (SSDs), digital cameras, cellular telephones, portable music players such as MP3 players, and movie players, among other electronic devices.

Memory devices can include memory cells that can store data based on the charge level of a storage element or can store data based on their conductivity state. Such memory cells can be programmed to store data corresponding to a target data state by varying the charge level of the storage element or by varying the conductivity level of the storage element. For example, sources of an electrical field or energy, such as positive or negative electrical pulses (e.g., positive or negative voltage or current pulses), can be applied to the memory cell (e.g., to the storage element of the cell) for a particular duration to program the cell to a target data state.

A memory cell can be programmed to one of a number of data states. For example, a single level memory cell (SLC) can be programmed to a targeted one of two different data states, which can be represented by the binary units 1 or 0 and can depend on whether the capacitor of the cell is charged or uncharged. As an additional example, some memory cells can be programmed to a targeted one of more than two data states (e.g., 1111, 0111, 0011, 1011, 1001, 0001, 0101, 1101, 1100, 0100, 0000, 1000, 1010, 0010, 0110, and 1110). Such cells may be referred to as multi state memory cells, multiunit cells, or multilevel cells (MLCs). MLCs can provide higher density memories without increasing the number of memory cells since each cell can represent more than one digit (e.g., more than one data bit).

BRIEF DESCRIPTION OF THE DRAWINGS

FIG. 2 illustrates periodic and activity-based memory management circuitry in accordance with some embodiments of the present disclosure.

DETAILED DESCRIPTION

Figure 1:
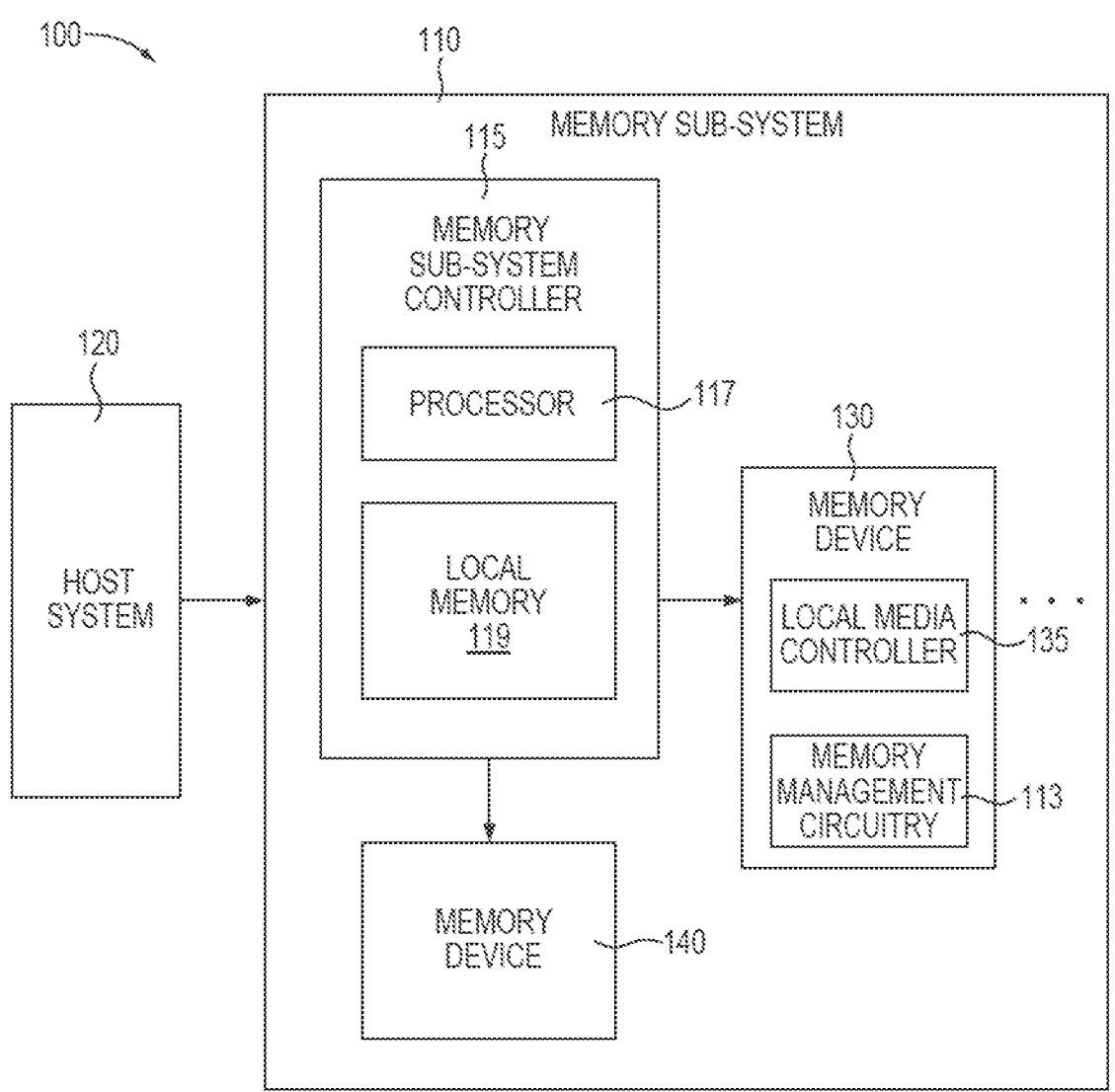
FIG. 1 illustrates an example computing system that includes a memory sub-system in accordance with some embodiments of the present disclosure.

The present disclosure includes apparatuses, methods, and systems for periodic and activity-based memory management. An embodiment includes a memory management block and a memory management bank coupled to the memory management block, wherein the memory management bank includes a plurality of memory banks and each memory bank of the plurality of memory banks includes an activate counter to increment responsive to the memory bank receiving an activate command (e.g., from a host or a controller). Each memory bank also includes circuitry to determine whether a value of the activate counter is greater than or equal to a wear leveling threshold (e.g., activity-based memory management threshold) and perform a wear leveling operation on data stored in the memory bank responsive to determining the value of the activate counter is greater than or equal to the wear leveling threshold.

Memory cells can endure a certain amount of memory operations (e.g., activate, program, sense, and/or erase operations) before they wear out (e.g., begin to degrade and/or malfunction). Multiple techniques can be implemented in a memory device to mitigate the effects of such degradation. One such technique is wear leveling. As used herein, the term "wear leveling" refers to evenly distributing program (e.g., write) operations throughout the memory cells in a memory device. In one wear leveling example, blocks of memory that are not currently storing data are examined, and the block with the lowest erase count can be selected for the next write operation. Wear leveling circuitry can select an empty block to write the data to update. This can be achieved by a controller that keeps track of the number of write operations performed on each block of memory cells. In another wear leveling example, a controller can select a block of memory out of all of the blocks of memory in a memory device as the block to rewrite the data to. The block can be a block that has relatively few entries, corresponding to blocks containing static data, or empty blocks. In yet another wear leveling example, a memory device can move stored data through all pages in a pool of pages and reassign addressing to track logical versus physical page locations. Wear leveling can prolong the life of memory cells by decreasing the number of writes performed on certain memory cells due to the writes being evenly distributed amongst the memory cells.

In previous approaches, circuitry can be configured to perform wear leveling on the memory cells after a certain amount of time has elapsed. As the amount of time gets shorter and the wear leveling is performed more frequently, the circuitry can accommodate activate commands to be issued at a greater maximum frequency. As used herein, the term "maximum frequency" refers to a frequency of issuing commands that is greater than a certain frequency of issuing commands. However, this can lead to extra and unnecessary wear leveling operations being performed on the memory cells during periods of low activity.

Further, memory cells may experience imprint. As used herein, "imprint" refers to a condition in which a memory cell becomes predisposed to storing one logic state over another, resistant to being written to a different logic state, or both. A memory cell can become imprinted when a logic state is stored by the memory cell and subsequent access operations may not be scheduled for the memory cell for an extended period of time while storing the logic state. Further, a memory cell can become imprinted when the same logic value may be consecutively written to the memory cell over the extended period of time.

Embodiments of the present disclosure, however, can reduce and/or prevent unnecessary wear leveling operations by performing wear leveling operations based on usage of the memory cells (e.g., rather than based on elapsed time). For example, a wear leveling operation can be performed on memory cells (e.g., on a bank of memory cells) based on the amount of activate commands received by the memory bank. Accordingly, wear leveling operations can be performed on a memory bank after the memory bank receives a predetermined amount of activate commands.

Further, embodiments of the present disclosure can reduce and/or prevent memory cell imprinting by implementing sense and flip cycles. As used herein, the term "sense and flip cycle" refers to a memory operation in which a row of memory cells is activated and data in those memory cells are rewritten to the memory cells in the opposite polarity. For example, the sense and flip operations can be performed on a memory bank after the memory bank receives a certain number of commands or after a certain amount of time.

As used herein, "a," "an," or "a number of" can refer to one or more of something, and "a plurality of" can refer to two or more such things. For example, a memory device can refer to one or more memory devices, and a plurality of memory devices can refer to two or more memory devices. Additionally, the designators "N" and "M" as used herein, particularly with respect to reference numerals in the drawings, indicates that a number of the particular feature so designated can be included with a number of embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, the term "coupled to" or "coupled with" can refer to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via an interface (e.g., a physical host interface). Examples of an interface can include, but are not limited to, a serial advanced technology attachment (SATA) interface, a peripheral component interconnect express (PCIe) interface, universal serial bus (USB) interface, Fibre Channel, Small Computer System Interface (SCSI), Serial Attached SCSI (SAS), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), Universal Serial Bus (USB), or any other interface. The interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The interface can provide a way for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell.

Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type memory (e.g., 2D NAND, 3D NAND) are described, the memory device 130 can be based on any other type of non-volatile memory or storage device, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g. processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface (not pictured) circuitry to communicate with the host system 120 via a physical host interface (not pictured). The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes memory management circuitry 113. In some embodiments, the memory management circuitry 113 is located on a memory device 130. As further described in FIG. 2, the memory management circuitry 113 can include a memory management block and a plurality of memory banks. Each memory bank can include a plurality (e.g., a group) of the memory cells of memory device 130, circuitry to perform a wear leveling operation, an activate counter, and circuitry to compare a value of the activate counter to a wear leveling threshold. The memory management circuitry 113 can be configured to perform a wear leveling operation on a memory bank (e.g., on the data stored in the memory cells of the memory bank) if the value of the activate counter is greater than a wear leveling threshold and perform a sense and flip operation on the memory bank (e.g., on the data stored in the memory cells of the memory bank) when a memory management command counter is greater than a sense and flip threshold (e.g., periodic memory management operation threshold). Performing wear leveling operations and sense and flip operations in such a manner can reduce and/or prevent unnecessary wear leveling operations from being performed on the memory bank, and can reduce and/or prevent memory cell imprint from occurring in the memory bank, as previously described herein.

FIG. 2 illustrates periodic and activity-based memory management circuitry 213 in accordance with some embodiments of the present disclosure. Periodic and activity-based memory management circuitry 213 can be, for instance, memory management circuitry 113 previously described in connection FIG. 1.

As shown in FIG. 2, the memory management (e.g., MM) circuitry 213 includes a memory management block 222 (e.g., an activity aware periodic memory management block) and memory management bank 229 that includes a plurality of memory banks 231-1, 231-2, . . . , 231-N (individually or collectively referred to as memory banks 231). In some embodiments, a memory device can include M memory management banks 229 and each memory management bank 229 can include N memory banks 231; therefore, a memory device can include M*N number of memory banks 231. A periodic MM command can be issued to any of the M number of memory management banks 229 and an activate command can be issued to any of the M*N number of memory banks 231. Each memory bank 231 can include a first logic gate 228-1, 228-2, . . . , 228-N (individually or collectively referred to as first logic gate 228), wear leveling circuitry 234-1, 234-2, . . . , 234-N (individually or collectively referred to as wear leveling circuitry 234), activate counter 236-1, 236-2, . . . , 236-N (individually or collectively referred to as activate counter 236), comparison circuitry 238-1, 238-2, . . . , 238-N (individually or collectively referred to as comparison circuitry 238), and second logic gate 242-1, 242-2, . . . , 242-N (individually or collectively referred to as second logic gate 242). Each memory bank 231 can also include a plurality (e.g., group) of memory cells (not shown in FIG. 2 for simplicity and so as not to obscure embodiments of the present disclosure). In some embodiments, every memory bank 231 in a memory management bank 229 can perform an action based on the memory management bank 229 receiving a single memory management command.

Each respective activate counter 236 can increment responsive to its memory bank 231 receiving an activate command. Comparison circuitry 238 can determine whether the value of activate counter 236 is greater than or equal to a wear leveling threshold by comparing the value of the activate counter 236 to the value of the wear leveling threshold, and wear leveling circuitry 234 can perform a wear leveling operation on the data stored in its memory bank 231 responsive to determining the value of the activate counter 236 greater than or equal to the wear leveling threshold.

In some embodiments, the memory management block 222 can determine whether a memory operation (e.g., a read, write, or erase operation) is performed on data stored in a memory bank 231 of the plurality of memory banks 231 in response to receiving the command to perform the memory operation. The command can be a read command, a write command, or an erase command received from a host (e.g., host 120 in FIG. 1). In some embodiments, the memory management block 222 can determine whether to perform a wear leveling operation on data stored in the memory bank 231, a sense and flip operation on data stored in the memory bank 231, or no operation on the data stored in the memory bank 231 in response to determining the memory operation has been performed on the data. The memory management block 222 can include a memory management counter 223 to increment responsive to the memory management bank 229 receiving a memory management command (e.g., periodic memory management command). As used herein, the term "periodic memory management command" refers to a command to facilitate a memory cell functioning as intended. In this embodiment, a memory management command may trigger a wear leveling operation or a sense and flip operation. For example, a controller (e.g., host 120 in FIG. 1) can issue a memory management command and, in response to receiving the memory management command, the memory management block 222 can trigger a wear leveling operation and/or a sense and flip operation. A plurality of periodic memory management commands can be converted into a possible activity-based memory management operation or a periodic memory management operation based on the value of the memory management counter 223. In some embodiments, the plurality of periodic memory management commands can be issued at a memory management interval (tMMI). The tMMI is an amount of time that allows a number of memory management commands to be issued that meets the requirements to trigger both time-based sense and flip operations and activity-based wear leveling operations when activate commands occur at a maximum frequency. The memory management block 222 can further include circuitry (not shown) to determine whether a value of the memory management counter 223 is greater than or equal to a sense and flip operation threshold, as well as perform a sense and flip operation on data stored in the memory bank 231 responsive to determining the value of the memory management counter 223 is greater than or equal to the sense and flip operation threshold. In some embodiments, an activity-based memory management operation will only be performed if the activate counter 236 is greater than or equal to an activity-based memory management command threshold.

A periodic memory management operation associated with a sense and flip operation may occur at a periodic time interval which is dependent upon the memory management interval and the sense and flip threshold. Further, after a plurality of periodic memory management commands that result in a possible activity-based memory management operation occur, a periodic memory management operation may be performed. Thus, the rate at which periodic memory management operations take place is dependent both upon the memory management interval and the sense and flip threshold. In some embodiments, a periodic memory management operation can include but is not limited to, a sense and flip operation. Further, an activity-based operation can include, but is not limited to, a wear leveling operation.

Each memory bank 231 can include a first logic gate 228 to couple the memory bank 231 to the memory management block 222. In some embodiments, the first logic gate 228 can be an AND gate. Further, the inputs of the first logic gate 228 can be an output of a third logic gate 243 and an output of circuitry 238 that compares a value of the activate counter 236 to the wear leveling threshold. The output of the first logic gate 228 can be sent to the wear leveling circuitry 234 to determine whether to perform a wear leveling operation (e.g., a wear leveling operation can be performed on data stored in the memory bank 231 based on the value of the output of the first logic gate 228).

Each memory bank 231 can further include a second logic gate 242 to couple a memory bank 231 to the other memory banks 231 of the plurality of memory banks 231. In some embodiments, the second logic gate 242 can be an OR gate. The first input of the second logic gate 242 can be an output of comparison circuitry 238 that compares a value of the activate counter 236 to the wear leveling threshold, and the second input of the second logic gate 242 can be an output from a second logic gate 242 of a different memory bank 231. For example, the inputs of the second logic gate 242-1 can be an output of comparison circuitry 238-1 and an output of second logic gate 242-2. The output of the second logic gate 242-1 can be an input of the third logic gate 243. In some embodiments, the last memory bank (e.g., memory bank 231-N) can include a second logic gate 242-N that is coupled to ground. For example, one of the inputs of the second logic gate 242-N can be ground instead of an output of a second logic gate 242 of a different memory bank 231.

The memory management circuitry 213 can include a third logic gate 243 to couple the memory management block 222 to the first logic gate 228 of each memory bank 231. In some embodiments, the third logic gate 243 can be an AND gate. The memory management circuitry 213 can send a wear leveling operation command to the plurality of memory banks 231 via the third logic gate 243. As shown in FIG. 2, the first input of the third logic gate 243 can be a signal indicative of a command (e.g., periodic command) to perform a wear leveling operation received from memory management block 222 and a second input can be an output of the second logic gate 242-1. In some embodiments, the output of the second logic gate 242-1 can indicate if the value of activate counter 236 of any of the memory banks 231 is greater than or equal to a wear leveling threshold. The memory management block 222 can send, via the third logic gate 243, a wear leveling operation command to the one or more memory banks 231 whose activate counter 236 has a value greater than or equal to the wear leveling threshold. Further, the memory management block 222 can send a sense and flip operation directly to the memory banks 231 when a value of the memory management counter 223 is greater than or equal to a sense and flip threshold. For example, the memory management block 222 can send a signal indicative of a sense and flip operation to a memory bank 231 without an intervening memory component between the memory management block 222 and the memory bank 231.

In some embodiments, the amount of power used for memory management by each memory bank 231 can be proportional to a quantity of activate commands received by the memory bank 231. For example, when the memory device has not received an activate command since the memory management counter was most recently reset, most of the power used by each memory bank 231 is used to perform sense and flip operations on the data stored in memory banks 231. However, as the memory device receives more activate commands, more of the power used by the memory device is used to perform wear leveling operations. In some embodiments, the performance of a wear leveling operation can use more, less, or the same amount power that is used to perform a sense and flip operation. In another embodiment, wear leveling operations are performed at a greater frequency than sense and flip operations during maximum activity. As used herein, the term "maximum activity" refers to activate commands being issued at the maximum frequency. Further, when there is no activity (e.g., a period where no activate commands are issued to the memory device), no wear leveling operation may be performed. By not performing any wear leveling operations, the power consumption of the memory device can be reduced. However, the memory device can still perform sense and flip operations during periods in which activate commands are not issued to the memory device. When a memory device receives more than a threshold number of activate commands in a certain amount of time, most of the periodic memory management commands can be converted to wear leveling commands. As the memory device receives less activate commands, the memory device may perform less wear leveling operations. In some embodiments, if the value of the activate counter 236 is below an activity-based memory management operation threshold (e.g., wear leveling threshold), the memory device is inhibited from performing an activity-based memory management operation.

In some embodiments, the frequency (e.g., quantity and/or number over time) of activate commands issued to the memory device can determine which operations are performed by the memory device upon receiving a periodic memory management command. For example, at maximum activity (e.g., maximum activate command frequency), the memory device can perform an activity-based memory management operation or a periodic memory management operation in response to the memory device receiving a periodic memory management command. In this example, maximum power consumption due to memory management occurs because all of the periodic memory management commands result in a memory management operation being performed.

If the memory device is receiving activate commands at a frequency that is less than the maximum activate command frequency, an activity-based memory management operation, a periodic memory management operation, or no memory management operation can be performed in response to the memory device receiving a periodic memory management command. When the memory device receives activate commands at a frequency that is less than the maximum activate command frequency, power consumption due to memory management is less than power consumption during maximum activity because the issuance of some memory management commands will result in no memory management operation being performed. In some embodiments, the power consumption due to memory management can be proportional to activity (e.g., the frequency by which activate commands are issued to the memory device). If the memory device has not received an activate command for more than a certain amount of time, either a periodic memory management operation or no operation may be performed in response to the memory device receiving a periodic memory management command directed to a memory management bank 229. When the memory device receives a periodic memory management command after not receiving an activate command for more than a certain amount of time, less power is consumed by the memory device due to memory management than the amount of power consumed during maximum activity. In some embodiments, the time interval for a periodic memory management operation to be performed on all of the memory banks 231 can be the same length of time whether activate commands are issued to the memory device at a maximum frequency, activate commands are issued to the memory device at less than the maximum frequency, or if activate commands are not being issued to the memory device. After a certain quantity (determined by the periodic memory management operation threshold and the memory management counter 223) of periodic memory management commands have been issued to the memory device and result in an activity-based memory management operation (e.g., wear leveling), a periodic memory management operation (e.g., sense and flip) can be performed.

In some embodiments, the memory device may include additional memory management banks 229, wherein each memory management bank 229 can be coupled to at least one other memory management bank 229. The memory management block 222 can receive a signal indicative of a periodic memory management command from an external component (e.g., a host or external controller) and issue the appropriate memory management operation to the specified memory management bank 229. A maintenance (e.g., memory management) operation can be performed in some or all memory banks 231 in a memory management bank 229 in response to the memory device receiving a periodic memory management command.

Figure 3:
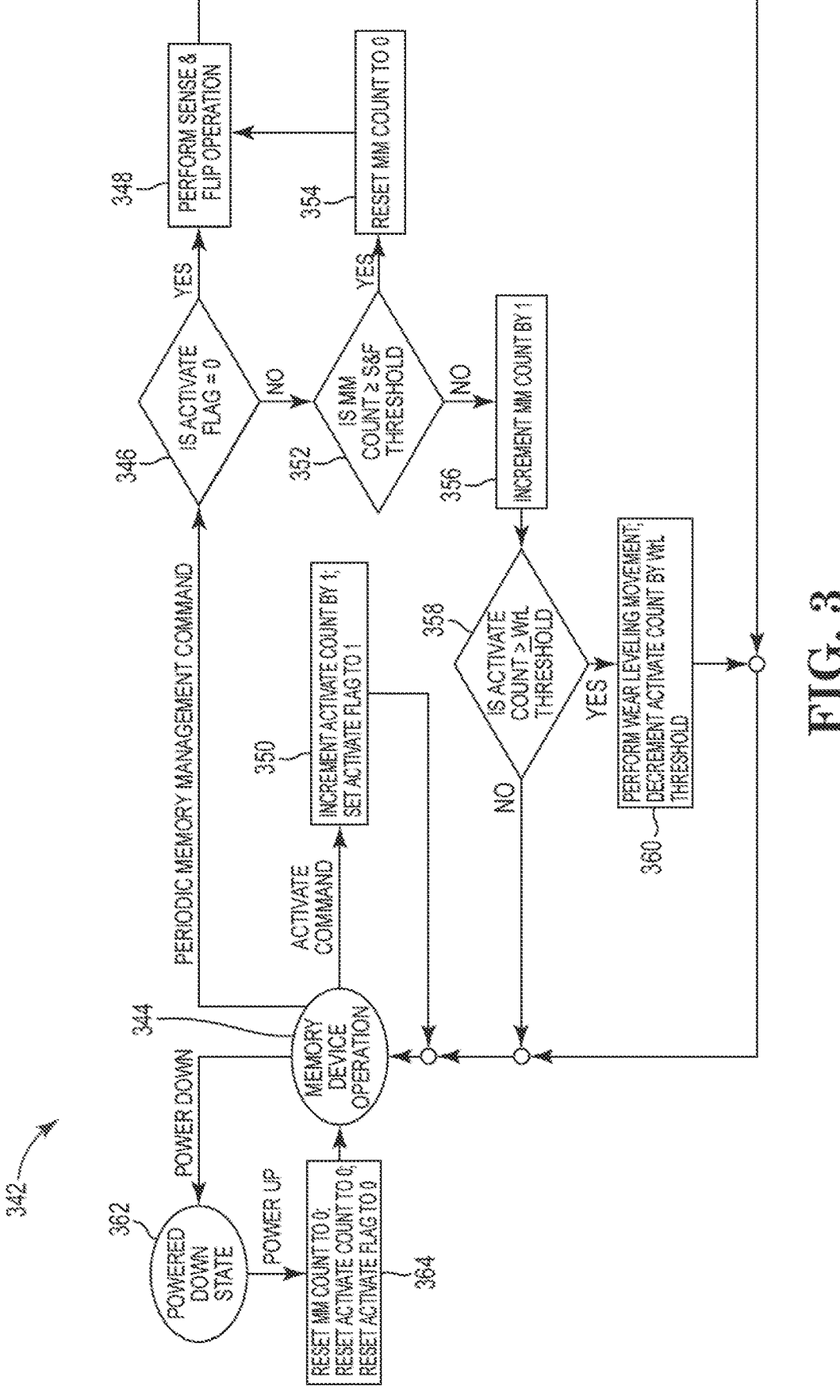
FIG. 3 is a flow diagram illustrating a method for periodic and activity-based memory management in accordance with some embodiments of the present disclosure.

FIG. 3 is a flow diagram illustrating a method 342 for periodic and activity-based memory management in accordance with some embodiments of the present disclosure. The method 342 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. As an example, the method 342 can be performed by memory management circuitry 113 and/or 213 previously described in connection with FIGS. 1 and 2, respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 344, a command to perform a memory device operation is received. If the command is a memory management command (e.g., periodic memory management command), method 342 proceeds to block 346. If the command is an activate command, method 342 proceeds to block 350.

At block 346, the method 342 can include determining a value of an activate flag. The activate flag can have a first value (e.g., a value of 0) or a second value (e.g., a value of 1). For instance, it can be determined whether the value of the activate flag is 0.

At block 348, method 342 can include performing a sense and flip operation on data stored in a memory (e.g., a memory bank) in response to determining the activate flag has a first value (e.g., a value of 0 or a value of 1). In some embodiments, the activate flag having a value, for example, of 0, can indicate that the corresponding memory bank (e.g., memory bank 231 in FIG. 2), a set of memory banks, or the entire memory device has not received an activate command since the memory management circuitry previously powered up and/or reset the value of the activate flag. Therefore, if the memory management circuitry determines, in response to receiving a memory management command, an activate command has not been issued since the memory management circuitry has reset the activate flag, the memory management circuitry can perform a sense and flip operation on the corresponding memory bank.

At block 352, the method 342 can include comparing a value of a first counter to a value of a first threshold in response to determining the activate flag has a second value (e.g., a value of 0 or a value of 1). In some embodiments, the activate flag having a value, for example, of 1, can indicate that the corresponding memory bank, set of memory banks, or entire memory device has received an activate command since the memory device has powered up and/or previously reset the value of the activate flag. In some embodiments, the first counter can be a memory management command counter that increments responsive to the memory receiving a memory management command. Further, in some embodiments, the first threshold can be a sense and flip operation threshold. As such, it can be determined at block 352 whether the value of the memory management command counter is equal to or greater than the sense and flip operation threshold.

At block 354, the method 342 can include resetting the value of the first counter (e.g., the memory management command counter) in response to determining the value of the memory management command counter is greater than or equal to the value of the first threshold (e.g., the sense and flip threshold). The value of the memory management command counter can be 0 after the value of the memory management counter is reset. At block 348, the method 342 can include performing a sense and flip operation in response to resetting the memory management command counter. At block 356, the method 342 can include incrementing the value of the memory management command counter (e.g., by 1) in response to determining the value of the memory management command counter is less than the value of the sense and flip threshold.

At block 358, the method 342 can include comparing the value of a second counter to the value of a second threshold. In some embodiments, the second counter can be an activate command counter that increments responsive to the memory receiving an activate command, and the second threshold can be a wear leveling operation threshold. As such, it can be determined at block 358 whether the value of the activate command counter is greater than or equal to the value of the wear leveling operation threshold. At block 360, the method 342 can include performing a wear leveling operation on data stored in the memory (e.g., in the memory bank) in response to determining the value of the second counter (e.g., the activate command counter) is greater than or equal to a value of the second threshold (e.g., the wear leveling threshold.

At block 360, the method 342 can further include decrementing the activate command counter by the value of the wear leveling threshold in conjunction with performing a wear leveling operation in response to determining the value of the activate command counter is greater than or equal to the wear leveling threshold. In some embodiments, the method 342 can further include refraining from performing the wear leveling operation in response to determining the value of the activate command counter is less than the value of the wear leveling threshold. For example, if no memory bank has an activate command counter that has a value that is greater than or equal to the wear leveling threshold, a wear leveling operation may not be sent to the memory bank. Alternatively, if at least one memory bank has an activate command counter that has a value that is greater than or equal to the wear leveling threshold, a signal indicative of the wear leveling operation is sent to every memory bank and the wear leveling operation is performed only on the memory banks that include an activate counter that has a value that is greater than or equal to the wear leveling operation threshold.

At block 350, the method 342 can include incrementing the value of the activate command counter and setting the value of an activate flag to 1 in response to receiving an activate command at block 344.

At block 362, the method 342 can include powering down the memory device to a powered-down state. At block 364, the method 342 can include resetting the value of the memory management command counter (e.g., to 0), resetting the value of the activate command counter (e.g., to 0), and resetting the value of the activate flag (e.g., to 0) in response to powering up the memory device to a powered-up state. Method 342 can then return to block 344. In some embodiments, if the memory device was powered down for longer than a threshold period of time, a sense and flip operation can be performed on every memory cell in the memory device. Further, this may occur quickly by issuing periodic memory management commands before any activate commands have been issued.

Figure 4:
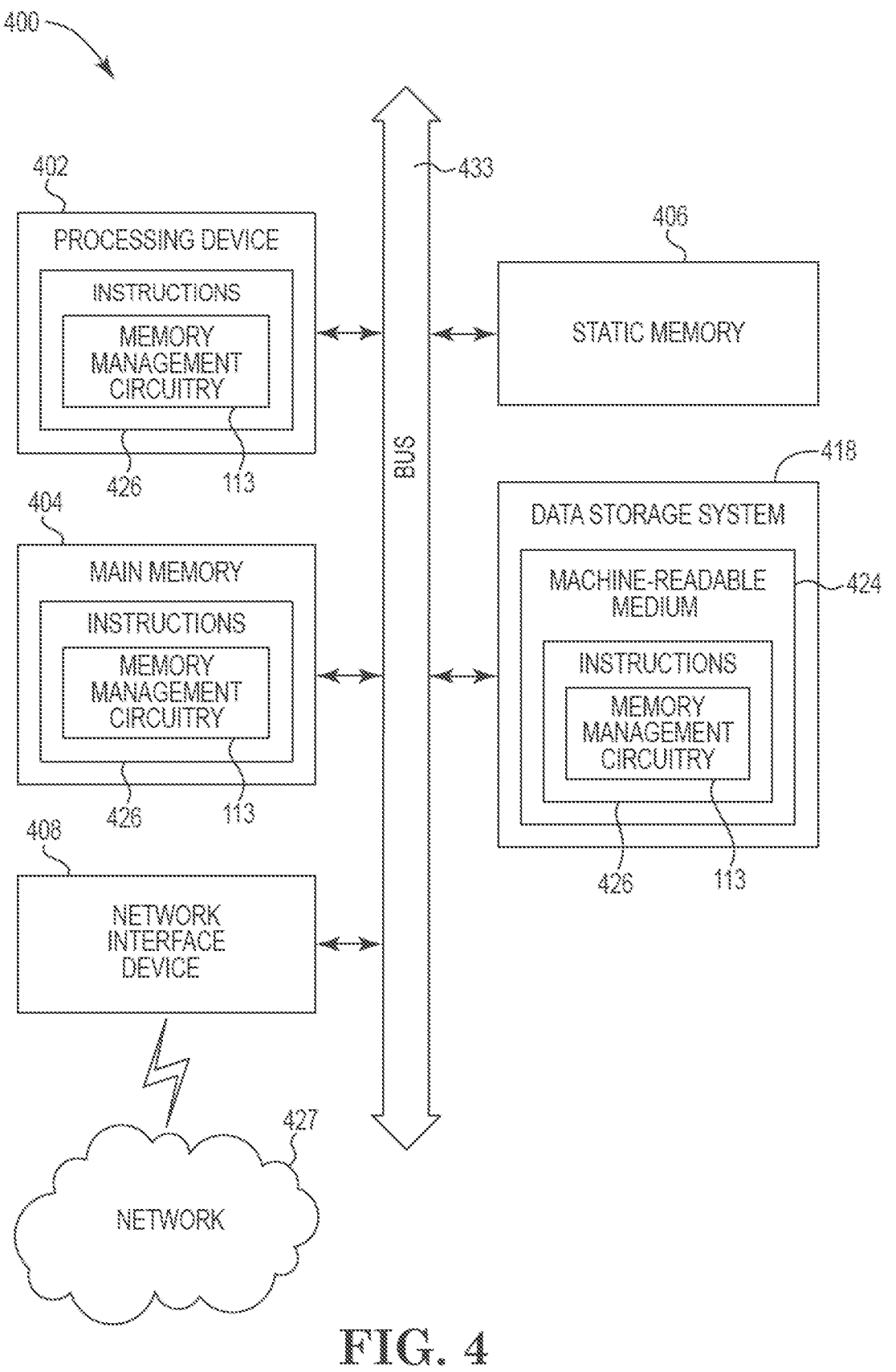
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 in FIG. 1) that includes, is coupled to, or utilizes a memory sub-system (e.g., the memory sub-system 110 in FIG. 1) or can be used to perform the operations of a controller (e.g., to execute an operating system to perform operations corresponding to the periodic and activity-based memory management circuitry 113 in FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 433.

The processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 427.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 in FIG. 1.

In one embodiment, the instructions 426 include instructions to implement functionality corresponding to periodic and activity-based memory management circuitry (e.g., the periodic and activity-based memory management circuitry 113 in FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

The present disclosure includes devices, methods, and systems supporting periodic and activity-based memory management circuitry. A number of embodiments include configurations of periodic and activity-based memory management circuitry.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:

a memory management block, wherein the memory management block includes a memory management counter to increment responsive to a memory management bank receiving a memory management command; and the memory management bank coupled to the memory management block, wherein:

the memory management bank includes a plurality of memory banks; and each memory bank of the plurality of memory banks includes:

an activate counter to increment responsive to the memory bank receiving an activate command; and circuitry to:

determine whether a value of the activate counter is equal to or greater than a wear leveling threshold;

perform a wear leveling operation on data stored in the memory bank responsive to determining the value of the activate counter is equal to or greater than the wear leveling threshold;

determine whether a value of the memory management counter is equal to or greater than a sense and flip operation threshold; and perform a sense and flip operation on data stored in the memory bank responsive to determining the value of the memory management counter is greater than the sense and flip operation threshold.

2. The apparatus of claim 1, wherein an amount of power used for memory management by each memory bank of the plurality of memory banks is proportional to a quantity of activate commands received by the memory bank.

3. The apparatus of claim 1, wherein the memory management block is to determine whether a memory operation is performed on data stored in a memory bank of the plurality of memory banks in response to receiving a command.

4. The apparatus of claim 3, wherein the memory management block is to determine whether to perform the wear leveling operation on data stored in the memory bank, a sense and flip operation on the data stored in the memory bank, or no operation on the data stored in the memory bank in response to determining the memory operation has been performed on the data.

5. A method, comprising:

determining a value of an activate flag;

performing a sense and flip operation on data stored in a memory bank in response to determining the activate flag has a first value;

comparing a value of a first counter to a value of a first threshold in response to determining the activate flag has a second value, wherein the first counter is a memory management command counter that increments responsive to the memory bank receiving a memory management command;

resetting the value of the first counter in response to determining the value of the first counter is greater than or equal to the value of the first threshold;

incrementing the value of the first counter in response to determining the value of the first counter is less than the value of the first threshold; and performing a wear leveling operation on the data stored in the memory in response to determining a value of a second counter is greater than or equal to a value of a second threshold.

6. The method of claim 5, wherein the first threshold is sense and flip operation threshold.

7. The method of claim 5, wherein the second counter is an activate counter that increments responsive to the memory receiving an activate command.

8. The method of claim 5, wherein the second threshold is a wear leveling operation threshold.

9. The method of claim 5, further comprising resetting the value of the first counter in response to powering up the memory.

10. The method of claim 5 further comprising resetting the value of the second counter in response to powering up the memory.

11. The method of claim 5, further comprising resetting the value of the activate flag in response to powering up the memory.

12. The method of claim 5, further comprising performing a sense and flip operation on the data stored in the memory in response to resetting the value of the first counter.

13. The method of claim 5, further comprising refraining from performing the wear leveling operation in response to determining the value of the second counter is less than the value of the second threshold.

14. A system, comprising:

a host; and a memory device coupled to the host, wherein the memory device includes:

memory management circuitry, wherein the memory management circuitry includes:

a plurality of memory banks; and a memory management block to determine whether to perform a sense and flip operation on data stored in the plurality of memory banks, perform a wear leveling operation on the data stored in the plurality of memory banks, or perform no operation on the data stored in the plurality of memory banks; and wherein each memory bank of the plurality of memory banks includes:

a first logic gate to couple the memory bank to the memory management block;

circuitry to perform the wear leveling operation;

an activate counter to increment responsive to the memory management circuitry receiving an activate command from the host;

circuitry to compare a value of the activate counter to a value of a wear leveling threshold; and a second logic gate to couple the memory bank to other memory banks of the plurality of memory banks.

15. The system of claim 14, wherein the memory management circuitry includes a third logic gate to couple the memory management block to the first logic gate of each memory bank.

16. The system of claim 15, wherein the memory management circuitry is to send a wear leveling operation command to the plurality of memory banks via the third logic gate.

17. The system of claim 14, wherein the second logic gate of one of the memory banks of the plurality of memory banks is coupled to ground.

18. A method, comprising:

determining a value of an activate flag;

performing a sense and flip operation on data stored in a memory bank in response to determining the activate flag has a first value;

setting the value of the activate flag to a second value in response to the memory receiving an activate command;

comparing a value of a first counter to a value of a first threshold in response to determining the activate flag has the second value;

resetting the value of the first counter in response to determining the value of the first counter is greater than or equal to the value of the first threshold;

incrementing the value of the first counter in response to determining the value of the first counter is less than the value of the first threshold; and performing a wear leveling operation on the data stored in the memory in response to determining a value of a second counter is greater than or equal to a value of a second threshold.

\* \* \* \* \*